Jan. 7, 1964  A. E. J. OWEN  3,116,820
EMBOSSING DIE HEAD FOR EMBOSSING MACHINES
Filed July 16, 1959  3 Sheets-Sheet 1
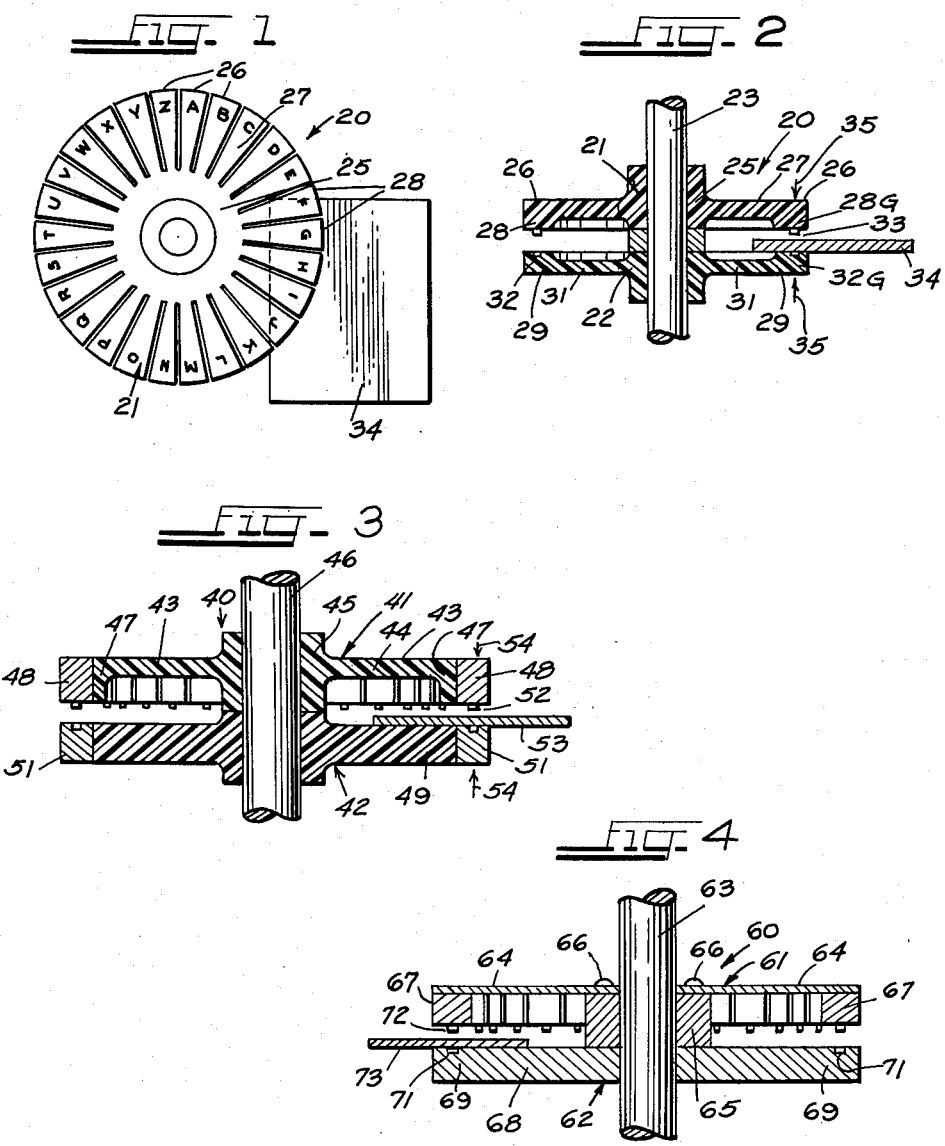
INVENTOR.
ARTHUR E. J. OWEN
BY
Wallace and Cannon
Attys.

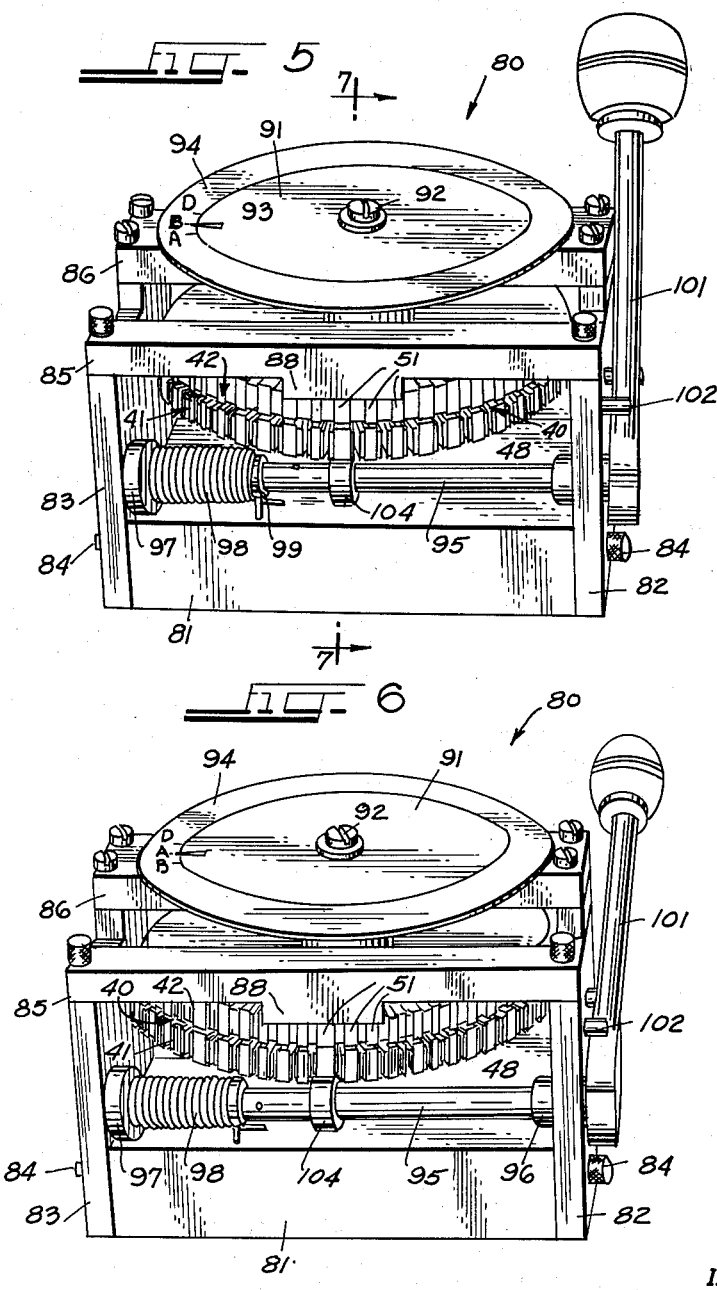

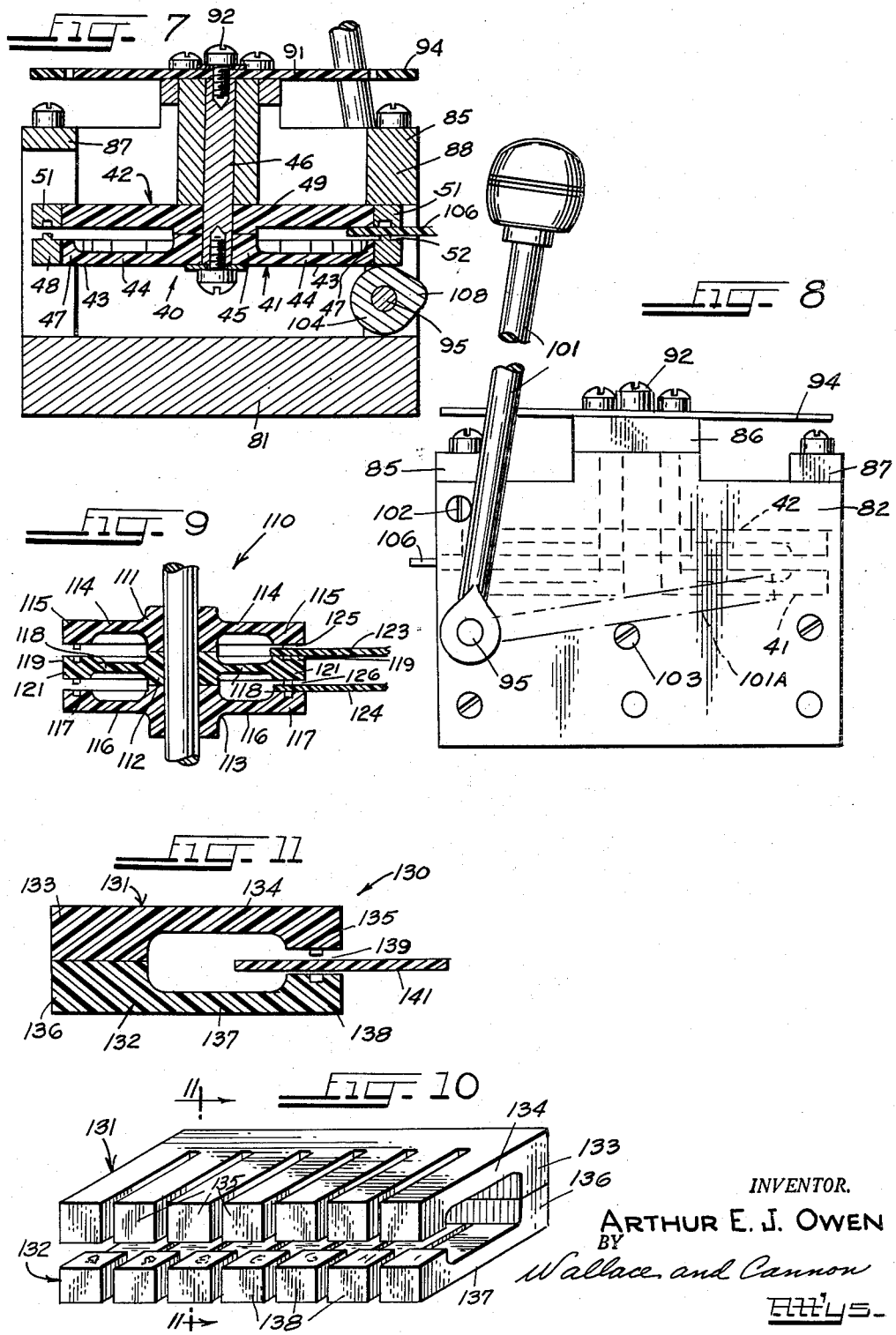

United States Patent Office 3,116,820
Patented Jan. 7, 1964

3,116,820
EMBOSSING DIE HEAD FOR EMBOSSING MACHINES
Arthur Edward Jeffrey Owen, Gates Mills, Ohio, assignor to Addressograph-Multigraph Corporation, Cleveland, Ohio, a corporation of Delaware
Filed July 16, 1959, Ser. No. 827,606
4 Claims. (Cl. 197—6.7)

This invention relates to new and improved embossing machines and particularly to new and improved die head constructions for embossing machines of either manually or automatically operated kinds.

In conventional embossing machines individual punches and dies which are used to emboss both alphabetic and numeric characters are mounted in a unit in the embossing machine, which unit is usually referred to as the die head. The individual punches and dies, hereinafter sometimes referred to as embossing elements, are usually made of steel and require a series of fabricating operations in order to achieve the necessary physical properties and precise dimensional control necessary to accurate embossing. The individual embossing elements are mounted in a support structure, usually by means of spring-loaded detents which hold the embossing elements in the support structure but permit limited movement during an embossing operation. A completed die head, including the punches and dies, the support structure, and the retaining means for mounting the punches and dies in the support structure is a relatively expensive unit which contributes substantially to the cost of the embossing machines, regardless of whether the machine is of the manually operated kind or is power driven.

Many embossed devices, such as the individual printing plates used for credit transactions and in similar applications, are now fabricated from plastics rather than from metal. These plastic credit cards or similar devices can be embossed with embossing elements formed from impact resistant plastics such as nylon. Consequently, the punches and dies can be molded by plastic molding equipment, eliminating the need for the complex and expensive manufacturing operations attendant upon the fabrication of steel embossing elements.

It is a primary object of the invention, therefore, to simplify the construction and reduce the cost of fabrication of the die head for an embossing machine, whether automatically or manually driven, by substantially reducing the number of parts in the die head. More specifically, it is an important object of the invention to eliminate entirely any need for moving parts in the die head of an embossing machine, thereby greatly simplifying the die head construction and reducing both its initial cost and the cost of maintenance thereof.

A further object of the invention is to provide an alternate construction for the punches and dies in the die head of an embossing machine by fabricating the punches and dies from a material other than steel. In particular, it is an object of the invention to fabricate embossing elements employed in an embossing machine from an impact resistant plastic, thereby greatly reducing the cost of the embossing elements as compared with conventional structures.

An additional object of the invention is to reduce the weight of the die head of an embossing machine, thereby facilitating operation of the embossing machine and making replacement of the die head substantially easier and more convenient.

Another object of the invention is to improve the shelf life of an embossing machine die head by eliminating all moving parts therein, so that accumulation of dirt, dust, and the like cannot impair the utility of the die head.

An additional object of the invention is to afford a new and improved construction for an embossing machine die head which is relatively simple and economical to manufacture and which reduces assembly costs to a minimum.

Other and further objects of the present invention will be apparent from the following description and claims and are illustrated in the accompanying drawings which, by way of illustration, show preferred embodiments of the present invention and the principles thereof and what are now considered to be the best mode for applying these principles. Other embodiments of the invention embodying the same or equivalent principles may be used and structural changes may be made as desired by those skilled in the art without departing from the present invention and the purview of the appended claims.

In the drawings:

FIG. 1 is a plan view of an embossing machine die head constructed in accordance with one embodiment of the invention;

FIG. 2 is a sectional elevation view of the die head of FIG. 1, taken approximately along line 2—2 therein;

FIG. 3 is a sectional view, similar to FIG. 2, of a modified form of die head constructed in accordance with the invention;

FIG. 4 is a sectional view, similar to FIG. 2, of another embodiment of the die head of the invention;

FIG. 5 is a perspective view of a simple, hand-operated embossing machine embodying a die head constructed in accordance with the invention;

FIG. 6 is a perspective view, similar to FIG. 5, showing the embossing machine in a different operating condition;

FIG. 7 is a sectional elevation view of the embossing machine taken approximately along line 7—7 in FIG. 5;

FIG. 8 is a side elevation of the embossing machine of FIGS. 5–7;

FIG. 9 is a sectional view, similar to FIG. 2, of a further modified form of embossing machine die head according to the invention;

FIG. 10 is a perspective view of a linear die head constructed in accordance with the invention; and FIG. 11 is a sectional view taken approximately along line 11—11 in FIG. 10.

FIGS. 1 and 2 illustrate a rotary die head for an embossing machine constructed in accordance with one embodiment of the present invention. The die head 20 comprises two support assemblies 21 and 22 which are mounted in spaced relation to each other upon a common shaft 23. The two support assemblies or discs 21 and 22 may be affixed to the shaft 23 for rotation therewith, by any suitable means such as one or more set screws (not shown) and may be spaced from each other by a bushing 24.

The support assembly 21 comprises a central annular base portion or core 25 from which a plurality of cantilever support members 26 project radially outwardly. The number of individual support members 26 depends upon the number of characters to be provided in the die head 20; in the illustrated die head, there are twenty-six individual fingers or support members, one for each letter in the alphabet. Of course, additional support members could be provided for numeric characters, punctuation, and the like, including special symbols if desired.

In the embodiment of FIGS. 1 and 2, the support assembly 21 is molded as a single, integral disc of resilient, impact resistant plastic, such as nylon. The inner portion 27 of each of the cantilever support members 26 is relatively thin in cross section to permit flexure of the support member during an embossing operation, as explained more fully hereinafter. The outer end of each of the cantilever support members, on the other hand, is relatively thick and constitutes an embossing element 28, in this instance the punch element of a punch-and-die combination.

The support assembly 22 is substantially similar to the assembly 21, and may also be molded as a single, integral plastic member. The individual cantilever support members 29 in this assembly may each have a relatively thin, flexible, resilient inner portion 31, the outer portion 32 of each arm 21 being relatively thick and constituting an embossing element. The embossing elements 32, however, comprise die elements in the embodiment of FIGS. 1 and 2, as compared with the punch elements 28. The cantilever support members 26 and 29, and their embossing elements 28 and 32, are arranged in pairs on opposite sides of an embossing space 33.

The use of the die head 20, in an embossing operation, is substantially similar to the more complex rotary die heads used heretofore. Thus, a plastic printing plate or other embossable device 34 is inserted in the embossing space 33 between the two sets of embossing elements 28 and 32. The die head 20 is rotated to bring the desired pair of punch and die elements into alignment with a predetermined portion of the device 34; in FIGS. 1 and 2, the embossing element pair 28G and 32G are shown in embossing position. The embossing elements are then forced together under pressure as indicated by the arrows 35, engaging both the punch and die elements with the device 34 and embossing the device. Movement of the punch and die toward each other is provided for by the flexible construction of the cantilever support arms 26 and 29 and their reduced base or inner portions 27 and 31. When the embossing operation is complete, and the external force is released, the resilient nature of the cantilever arms causes the arms to return to their original positions relative to each other, releasing the printing plate 34 for movement relative to the die head for a subsequent embossing operation.

The die head 20, and the other embodiments of the invention described hereinafter, can be employed in either automatic or manually operated machines; the particular apparatus employed to adjust the die head position and to apply pressure to the embossing elements is immaterial to the invention. There are no moving parts in the die head, thus reducing both construction and maintenance costs. The die head cannot be harmed by normal accumulations of dust and the like when it is not in use, and its light weight greatly facilitates removal and replacement in an embossing machine. The plastic embossing elements are, of course, quite inexpensive as compared with metal punches and dies.

FIG. 3 illustrates, in a view similar to FIG. 2, a somewhat modified construction for the embossing machine die head of the invention. The die head 40 shown in FIG. 3 is substantially similar to that of FIGS. 1 and 2 in that it includes a first support assembly 41 and a second support assembly 42. Furthermore, the upper support assembly 41 is somewhat similar to the previous described support assembly 21 in that it comprises a plurality of individual cantilever support arms 43 each having a relatively thin flexible central portion 44, the inner end of each of the arms 43 being secured to a central hub or core 45 which is affixed to a shaft 46. The arms 43 and the core 45 are preferably molded as a single integral part from a relatively resilient plastic material such as nylon. The slots between the individual arms 43 may be formed during the molding process or may be cut in a molded disc as a subsequent and separate operation.

The outer end 47 of each of the arms 43 is relatively thick and affords a means for mounting an embossing element 48 at the end of the cantilever arm. In this instance, the embossing element 48 is a metal punch or die and preferably is incorporated in the plastic mold when the support assembly 41 is molded, so that the embossing element becomes an integral part of the support assembly.

The second support assembly 42, in the embodiment of FIG. 3, comprises a relatively thick and rigid plastic disc 49 which is also secured to the shaft 46 for rotation therewith. Unlike the embodiment of FIGS. 1 and 2, the second support assembly 42 is not divided into individual cantilever support members. Instead, the entire support member is relatively rigid in construction. A series of embossing elements 51 are mounted on and comprise a part of the second support assembly 42, being located near the periphery of the disc 49, and are aligned with the embossing elements 48 of the first support assembly 41. The embossing elements 51 are, of course, complementary to the embossing elements 48; in the illustrated construction, the elements 48 comprise punches and the elements 51 comprise dies adapted to cooperate with the punches. The punches and dies are spaced from each other and face inwardly of an embossing space 52 into which a plastic printing plate or other embossable device 53 may be inserted for embossing.

Operation of the embodiment of FIG. 3 is substantially similar to that of FIGS. 1 and 2. To emboss the printing plate or other device 53, the plate is inserted in the embossing space 52. The die head 40 is rotated to bring the desired punch and die combination into alignment with a predetermined part of the device 53. A force is then applied to the die head, as indicated by the arrows 54, tending to force the punch and die elements 48 and 51 toward each other. Since the second die head 42 is relatively rigid in construction, the embossing element 51 does not change its position appreciably. The embossing element 48, however, is moved downwardly, as viewed in FIG. 3, forcing the punch element 48 into engagement with the embossable device 53, under pressure, and effectively embossing the device. This operation is repeated to emboss whatever legend is desired in the printing plate or similar device 53.

FIG. 4 illustrates another embodiment of the die head of the invention which comprises a first or upper support assembly 61 and a second or lower support assembly 62, both of which are affixed to a shaft 63 for rotation therewith. The first or upper support assembly 61 of the die head 60 comprises a plurality of flexible cantilever support arms 64, which in this instance are fabricated from a relatively flexible and resilient metal. The individual arms 64 are affixed to a central core or bushing 65 by suitable means, such as the rivets 66; welding or other fastening means may be employed if desired. At the outer end of each of the arms 64 there is mounted an embossing element 67 which, in the illustrated arrangement, may comprise the punch element of a punch and die combination. As in the case of the previously described embodiments, the number of individual embossing elements 67 is determined by the number and variety of different characters to be incorporated in the die head structure.

The lower support assembly 62 of the die head 60 comprises a relatively rigid metal disc 68 having a plurality of individual die elements 69 disposed around the periphery thereof. The die elements 69 may be fabricated as individual members and subsequently mounted upon the disc 68 by suitable means. On the other hand, and as shown in FIG. 4, the die elements 69 may be formed directly by fabricating the disc 68 with suitable die openings 71 therein. The disc 68 is, of course, effectively secured to the bushing or core 65 so that the two support assemblies 61 and 62 are constrained to rotate together, maintaining the embossing elements 67 and 69 in accurate alignment with each other. As before, the punch and die elements of the die head 60 are separated from each other by an embossing space 72 to provide for insertion of a plastic printing plate or other embossable device 73 therebetween.

Operation of the die head 60 is essentially the same as the die head 40 described hereinabove in connection with FIG. 3. The plastic printing plate or other device 73 is inserted into the embossing space 72, the die head is rotated to select the desired character, and a force is applied to the upper die head 61 as indicated by the arrow 74, to emboss the device 73. Of course, the embossing force must be applied to only one pair of embossing elements 67, 69 at a given time in order to emboss only the desired character. In this embodiment, as in that of FIG. 3, only the punch 67 moves to any substantial extent, due to the rigid construction employed in the lower die head support assembly 62.

FIGS. 5-8 illustrate a very simple manually operated embossing machine 80 which includes a die head constructed in accordance with the invention, specifically the die head 40 of FIG. 3. In this instance, however, the die head 40 is inverted, as compared with the arrangement illustrated in FIG. 3, the support assembly 41 being located below the support assembly 42.

The embossing machine 80 comprises a base member 81 to which a pair of side members 82 and 83 are secured by suitable means such as the screws 84. At the top part of the embossing machine, the two side plates 82 and 83 are connected by three rails 85, 86 and 87. The front and rear rails 85 and 87 (see FIGS. 7 and 8) are mounted somewhat lower than the center rail 86. The central portion of the front rail 85 is provided with a die anvil 88 which engages the upper surface of a limited number of the embossing elements 51 of the die head 40.

The operating shaft 46 for the die head 40 is suspended from the center rail 86, as best illustrated in FIGS. 7 and 8. At the top of the embossing machine, an indicator member 91 is affixed to the shaft 46 by suitable means such as a screw 92 so that the indicator member 91 rotates with the shaft. The indicator member 91 may conveniently be fabricated from a thin sheet of plastic and is provided with an indicator marking 93 which cooperates with a scale on a separate scale member 94. The scale member 94 is affixed to the rail 86 by any suitable means and may, for example, be bonded to the rail or fastened thereto by screws.

A cam shaft 95 extends across the front of the embossing machine 80 and is mounted in suitable bearings in the two side plates 82 and 83, these bearings being indicated by the reference numerals 96 and 97. A torsion spring 98 is mounted at the left hand end of the cam shaft 95, as seen in FIGS. 5 and 6. One end of the torsion spring 98 is secured to the shaft 95 by suitable means such as a collar 99, the other end of the spring being secured to the bearing member 97.

The shaft 95 is extended through the side plate 82 and an operating handle 101 is secured to the outboard end of the shaft. A pair of stop pins 102 and 103 are mounted on the side plate 82 to afford a means for limiting angular movement of the handle 101 to an initial position shown in solid lines in FIG. 8 and an actuated or embossing position illustrated by the phantom outline 101A in that figure. In FIG. 5, the handle 101 is in its normal or initial position, whereas in FIG. 6 the handle is shown in actuated or embossing position. The torsion spring 98 biases the shaft 95 toward rotation in a counterclockwise direction, as seen in FIG. 8, and normally holds the shaft 95 and the handle 101 in the initial or unactuated position.

An anvil cam 104 is mounted upon the shaft 95 in the central portion thereof, being rigidly affixed to the shaft to rotate therewith. The width of the cam 104 is made slightly smaller than the width of one of the individual embossing elements 48 in the lower support structure 41 of the die head 40, so that operation of the cam can be limited to one of the embossing elements 48 as described in further detail hereinafter.

Operation of the embossing machine 80 is extremely simple, yet provides for a relatively high output level. At the outset, a plastic printing plate or other embossable device 106 is inserted in the embossing space 52 between the two support assemblies 41 and 42 (see FIGS. 7 and 8). The machine operator rotates the die head 40 to bring the desired combination of embossing elements 48 and 51 into embossing position in alignment with the anvil cam 104. In so aligning the die head 40, the operator is assisted by the indicator device comprising the indicator member 91 and the scale on the member 94. With the die head thus aligned, and with the embossable device 106 in proper position, the operator rotates the handle 101 from its initial or unactuated position, in a clockwise direction, to the embossing position 101A (see FIG. 8). As a consequence, the shaft 95 is rotated to bring the lobe 108 on the anvil cam 104 into engagement with the selected one of the embossing elements 48, driving the embossing element 48 upwardly into engagement with the device 106 and effectively embossing that device. This sequence of operation is repeated as many times as are necessary to emboss the desired legend on the printing plate or device 106. During each embossing operation, the upper anvil member 88, which comprises a part of the rail 85, prevents upward movement of the selected embossing element 51.

FIG. 9 illustrates another die head 110, in a view similar to FIG. 2, which is constructed in accordance with the present invention. The die head 110 comprises three individual support assemblies 111, 112, and 113, each of which includes a plurality of individual resilient cantilever support arms. Each of the support arms 114 of the die head support assembly 111 carries, at its outer end, an embossing element 115. Similarly, the cantilever arms 116 of the support assembly 113 are each provided, at their outer ends, with an embossing element 117. The individual support arms 118 of the intermediate support assembly 112, on the other hand, each carry, at the outer end thereof, a pair of embossing elements 119 and 121. In the illustrated arrangement, embossing elements 115 and 121 each comprise punches, whereas the embossing elements 117 and 119 are dies. It is thus seen that the die head 110 is provided with two sets of punches and dies and can therefore be used for two embossing operations which are effected simultaneously.

In operation, the embodiment of FIG. 9 is used to emboss a pair of plastic printing plates or similar devices 123 and 124, inserted in the embossing spaces 125 and 126, respectively, between the upper and lower pairs of embossing elements. Selection of the desired embossing characters is again effected by rotation of the die head. It should be noted that, in this arrangement, it is not necessary that the character embossed by the upper pair of embossing elements 115, 119 be the same as that embossed by the lower pair 117, 121. Instead, the upper pair of embossing elements may be utilized to emboss a code designation corresponding to a type character or numerical character embossed by the lower pair. Thus, it is possible to produce, simultaneously, a coded printing device or similar member 123 and a direct reading but otherwise similar device 124. Similarly, one set of the punches and dies may be replaced by a printing element, on one side, and a flat printing surface on the opposite side to provide for preparation of a printed record that corresponds to a device simultaneously embossed in the die head. In all other respects, operation of the die head 110 of FIG. 9 is substantially similar to that of the previously described embodiments.

The embodiments of the invention described hereinabove are all of the rotary type, but the present invention is not limited to use with rotary die heads. It is equally applicable to and useful in a linear die head of the kind employed in the embossing machine described and claimed in the co-pending application of Edwin C. Colyer and Elmer A. Schultz, Serial No. 776,661, filed November 21, 1958, now Patent No. 2,919,779. A linear die head of this general type is illustrated in FIGS. 10 and 11.

The linear embossing machine die head 130 shown in

FIGS. 10 and 11 comprises a first support assembly 131 and a second support assembly 132. The support assembly 131 includes a relatively thick and rigid base portion 133 from which a series of elongated flexible resilient cantilever support members 134 project. The outer end of each of the cantilever support members 134 supports an embossing element 135. In the illustrated arrangement, the entire support assembly 131 is fabricated as a single integral plastic member, preferably molded from a relatively resilient impact resistant material such as nylon.

The second support assembly 132 is essentially similar in construction to the support assembly 131 and includes a relatively heavy and rigid base portion 136 from which a plurality of cantilever support members 137 project, each of the support members 137 terminating in an embossing element 138. The base portion 136 is bonded or otherwise rigidly affixed to the base portion 133 of the first support assembly. The embossing elements 138 are disposed directly opposite the embossing elements 135 of the first support assembly, being arranged in pairs or punch-and-die combinations. The punch and die elements are separated by an embossing space 139 into which the plastic plate or other embossing device 141 may be inserted for an embossing opeartion.

The die head 130 of FIGS. 10 and 11, in operation, functions in substantially the same manner as the previously described embodiments of the invention except that selection of the desired punches and dies is effected by linear movement of the die head rather than rotary motion. In all other respects, this embodiment of the invention may correspond fully to the previously described constructions. Of course, the construction in FIGS. 10 and 11 may be modified to provide for metal punches and dies, as in the arrangement of FIG. 3. By the same token, one of the support assemblies of the die head 130 may be made relatively rigid, as in the embodiments of FIGS. 3 and 4, and resilient metal cantilever support members may be employed therein as described in connection with FIG. 4.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. An embossing machine die head comprising: a first support assembly, comprising a plurality of individual self-supporting resilient flexible cantilever support members, a second support assembly mounted in spaced relation to said first support assembly to afford an embossing space therebetween; a plurality of embossing elements individually affixed to the outer ends of respective ones of said cantilever support members and facing said embossing space, said second support assembly having a corresponding plurality of complementary embossing elements thereon facing said embossing space and aligned with the embossing elements on said first support assembly to provide for embossure of a device disposed in said embossing space when the outer end of one of said cantilever support members is forced toward said second support assembly; and means for simultaneously preparing, on a separate instrument, a record corresponding to the data embossed at said embossing space, said means including a third support assembly disposed on the side of the second support assembly opposite said embossing space, a plurality of recording elements carried by said third support assembly and effective to coact with the second support assembly to effect a recording operation during each embossing operation.

2. An embossing machine die head comprising: a first support assembly, comprising a base of predetermined thickness dimension and a plurality of individual self-supporting resilient flexible cantilever support members connected to and projecting from the base in spaced relationship to one another, a relatively rigid second support assembly mounted in spaced relation to said first support assembly to afford an embossing space therebetween, said cantilever support members being of substantially less thickness dimension than the related base and terminating in outer thickened end portions that are to be subjected to embossing pressure, a plurality of embossing elements carried by the outer thickened ends of respective ones of said cantilever support members and facing said embossing space, said second support assembly having a corresponding plurality of complementary embossing elements thereon facing said embossing space and aligned with the embossing elements on said first support assembly to provide for embossure of a device disposed in said embossing space when the outer thickened end of one of said cantilever support members is forced toward said second support assembly, said first support assembly including the base and the support members and the thickened end portions comprising a single, integral part of molded impact resistant plastic whereby the base of the first support assembly when secured to a support therefor is rigid compared to said cantilever support members of substantially less thickness which flex when embossing forces are exerted on said thickened end portions.

3. A die head according to claim 2 wherein each of said first and second support assemblies is composed of a single integral part of molded impact resistant plastic.

4. A die head according to claim 3 wherein said second support assembly is configured substantially identically to the first support assembly.

References Cited in the file of this patent

UNITED STATES PATENTS

| | | |
|---|---|---|
| 364,671 | Reynolds | June 14, 1887 |
| 612,922 | Bradley | Oct. 25, 1898 |
| 615,677 | Burton | Dec. 13, 1898 |
| 713,323 | Merritt | Nov. 11, 1902 |
| 1,153,832 | Thorson | Sept. 17, 1915 |
| 1,173,020 | Page | Feb. 22, 1916 |
| 1,303,124 | Spees | May 6, 1919 |
| 1,373,545 | Wiegman | Apr. 5, 1921 |
| 1,386,535 | Rothe | Aug. 2, 1921 |
| 1,879,354 | Levi | Sept. 27, 1932 |
| 2,079,236 | Zipf | May 4, 1937 |
| 2,284,076 | Van Buren | May 26, 1942 |
| 2,415,526 | Payne | Feb. 11, 1947 |
| 2,450,656 | Gowland | Oct. 5, 1948 |
| 2,630,201 | Rowan | Mar. 3, 1953 |
| 2,978,751 | Bright | Apr. 11, 1961 |